(12) United States Patent
Pala (10) Patent No.: US 12,061,721 B1
(45) Date of Patent: Aug. 13, 2024

(54) SYSTEMS AND METHODS FOR PRIVATE CONTACT TRACING

(71) Applicant: CABLE TELEVISION LABORATORIES, INC., Louisville, CO (US)

(72) Inventor: Massimiliano Pala, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 126 days.

(21) Appl. No.: 17/384,324

(22) Filed: Jul. 23, 2021

Related U.S. Application Data

(60) Provisional application No. 63/055,425, filed on Jul. 23, 2020.

(51) Int. Cl.
*H04L 29/06* (2006.01)
*G06F 21/62* (2013.01)
*H04W 4/021* (2018.01)
*H04W 4/029* (2018.01)

(52) U.S. Cl.
CPC ...... *G06F 21/6254* (2013.01); *G06F 21/6263* (2013.01); *H04W 4/021* (2013.01); *H04W 4/029* (2018.02)

(58) Field of Classification Search
CPC ............ G06F 21/6254; G06F 21/6263; H04W 4/029; H04W 4/021; H04W 12/02; G16H 50/80; G16H 50/70
See application file for complete search history.

(56) References Cited

U.S. PATENT DOCUMENTS

2017/0331805 A1\* 11/2017 Pham ................. G06Q 30/0271
2018/0052970 A1\* 2/2018 Boss ....................... G06F 21/35
2021/0391072 A1\* 12/2021 Ergen ..................... G16H 50/80

\* cited by examiner

*Primary Examiner* — Yogesh Paliwal
(74) *Attorney, Agent, or Firm* — Armstrong Teasdale LLP (57) ABSTRACT

A server device is provided for privacy protecting contact tracing. The server device includes a transceiver configured for operable communication with at least one server of the communication network, and a processor including a memory configured to store computer-executable instructions. When executed by the processor, the instructions cause the server device to perform, by the transceiver, a scan to detect one or more nearby user devices, identify a unique identifier for each of the one or more nearby devices, store the unique identifiers of the one or more nearby devices, receive a notification including a first unique identifier, compare the first unique identifier to the stored unique identifiers, and alert the user of the user device if the first unique identifier matches one of the stored unique identifiers.

20 Claims, 6 Drawing Sheets

SYSTEMS AND METHODS FOR PRIVATE CONTACT TRACING

CROSS REFERENCE TO RELATED APPLICATIONS

This application claims the benefit of and priority to U.S. Provisional Application No. 63/055,425, filed Jul. 23, 2020, entitled "PRIVACY-PRESERVING CONTACT TRACING (P2CT)," which is hereby incorporated by reference in its entirety.

BACKGROUND

The field of the invention relates generally to private contact tracing, and more specifically, to systems and methods for using personal devices to provide contact tracing while maintaining an individual's privacy.

Contact Tracing is used to track the proximity of people, objects, and robots. When any of the traced people changes status, a notification is sent to the people that came in contact in the past 'X' days/period. This information can be then used to look for dynamics or to plan for testing during a pandemic.

In order to track activities, identifiers need to be used for looking up information about who's been in proximity. One of the problems of manual contact tracing is that the average person can only remember of a few of the contacts that they have had in a day. In many cases, centralized databases are used to store all possible contact information. However, this comes with a lot of risks including privacy implications. Central databases contain a lot of information that could be leaked or mis-used. While distributed databases might be used to limit the data leaked in a single incident, but the data still needs to be distributed to those who need it.

Furthermore, while the pandemic is a global problem, contact tracing is primarily done effectively at a local level. Contact tracing in New York, does not generally help with people solely in Colorado, or vice versa. Techniques that work at the local level without being bogged down by tracing at the global level and still protecting the privacy of the users would be advantageous.

SUMMARY

In an embodiment, user device for privacy protecting contact tracing is provided. The user device includes a transceiver configured for operable communication with at least one server of the communication network and a processor including a memory configured to store computer-executable instructions. When executed by the processor the instructions cause the user device to perform, by the transceiver, a scan to detect one or more nearby user devices. The instructions further cause the user device to identify a unique identifier for each of the one or more nearby devices. The instructions also cause the user device to store the unique identifiers of the one or more nearby devices. In addition, the instructions cause the user device to receive a notification including a first unique identifier. Moreover, the instructions cause the user device to compare the first unique identifier to the stored unique identifiers. Furthermore, the instructions cause the user device to alert the user of the user device if the first unique identifier matches one of the stored unique identifiers.

In a further embodiment, a server device for privacy protecting contact tracing is provided. The server device includes a transceiver configured for operable communication with a plurality of user devices and a processor including a memory configured to store computer-executable instructions. When executed by the processor the instructions cause the server device to store a plurality of channels. Each channel is associated with a location of a plurality of locations. Each channel of the plurality of channels includes a plurality of subscribers. The instructions further cause the server device to receive a user notification from a user device. The instructions also cause the server device to determine at least one channel associated with the user notification. In addition, the instructions cause the server device to generate a notification to transmit to the plurality of subscribers of the at least one channel. Moreover, the instructions cause the server device to transmit the notification to a plurality of user devices associated with the plurality of subscribers.

In another embodiment, a method for privacy protecting contact tracing is provided. The method includes scanning, by a user device, an area around the user device to detect one or more nearby user devices. The method also includes identifying, by the user device, a unique identifier for each of the one or more nearby devices. The method further includes storing, in the user device, the unique identifiers of the one or more nearby devices. In addition, the method includes receiving, by the user device, a notification including a first unique identifier. Moreover, the method includes comparing, by the user device, the first unique identifier to the stored unique identifiers. Furthermore, the method includes alerting, by the user device, the user of the user device if the first unique identifier matches one of the stored unique identifiers.

BRIEF DESCRIPTION

These and other features, aspects, and advantages of the present disclosure will become better understood when the following detailed description is read with reference to the following accompanying drawings, in which like characters represent like parts throughout the drawings.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

Figure 1:
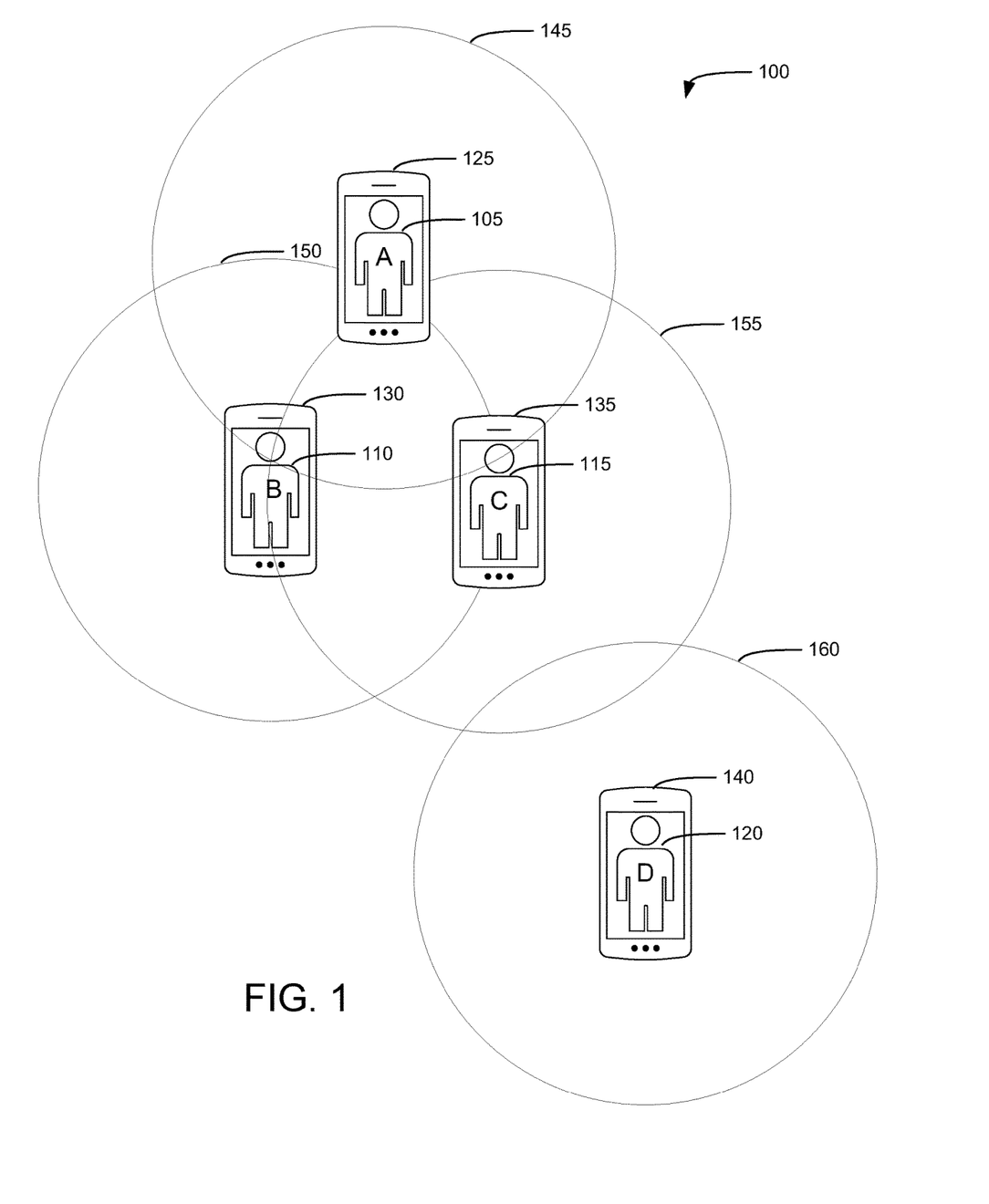
FIG. 1 illustrates a diagram of an environment including a plurality of users using a contact tracing system in accordance with at least one embodiment.

FIG. 1 illustrates a diagram of an environment 100 including a plurality of users using a contact tracing system in accordance with at least one embodiment. Environment 100 shows four users, user A 105, user B 110, user C 115, and user D 120. Each of the users 105-120 in environment 100 is associated with a corresponding user device 125, 130, 135, and 140. User A 105 is associated with user device A 125. User B 110 is associated with user device B 130. User C 115 is associated with user device C 135. And User D 120 is associated with user device D 140.

In the exemplary embodiment, each user device A-D 125-140 is capable of transmitting and receiving wireless signals and messages. The wireless signals can include, but are not limited to, Bluetooth, Wi-Fi, Near Field Communication (NFC), Zigbee, radio frequency (RF) signals, and other signals. User devices A-D 125-140 can be any device capable of transmitting and receiving wireless signals and messages, including, but not limited to, a desktop computer, a laptop computer, a personal digital assistant (PDA), a cellular phone, a smartphone, a tablet, a phablet, a smartwatch, Internet of Things device, a wearable device, or other web-based connectable equipment.

Each user device A-D 125-140 has a corresponding area of contact 145-160 that surrounds the corresponding user device A-D 125-140. The area of contact 145-160 represents the area around the user 105-125 and/or the user device 125-140 where the user device 125-140 is capable of receiving and transmitting wireless messages to indicate that the associated users 105-120 might be close enough to be in 'contact' for the purposes of contact tracing. In some embodiments, the size of areas of contact 145-160 may be set by the user or others. In other embodiments, the size of the areas of contact 145-160 are based on the type of infection and transmission qualities of the infection. In still further embodiments, the size of the areas of contact 145-160 may be based on the capabilities of the corresponding user device 125-140 and/or the environment where the user devices 125-140 are located. For example, in an open setting, such as a parking lot, the areas of contact 145-160 can be larger than in an enclosed setting, such as an office. The difference in sizes of the areas of contact 145-160 can be based on the materials and objects around the user devices 125-140.

In FIG. 1, user device A 125, user device B 130, and user device C 135 are within each other's areas of contact 145-155. User device A 125 can transmit a contact message, which would then be received by user device B 130 and user device C 135. In addition, user device A 125 can also receive contact messages from user devices B 130 and C 135. However, user device D 140 is far enough away from the other user devices 125-135, that user device D 140 can neither transmit contact messages to nor receive contact messages from the other user devices 125-135.

In the exemplary embodiment, a contact message is a message transmitted from a user device 125-140 that provides a unique identifier for the user device 125-140. For example, the unique identifier could be a media access control address (MAC address) associated with the user device 125-140. In some embodiments, each user device 125-140 periodically pushes out a contact message including its unique identifier for contact tracing purposes. In other embodiments, each user device 125-140 periodically scans for other user devices 125-140 in the area and receives a unique identifier from the detected user devices 125-140 in response to the scan. For example, user device A 125 could scan its area of contact 145 for other user devices 130-140. In this case, user device A 125 would detect user device B 130 and user device C 135. User device A 125 could then take a unique identifier from each device 130 and 135, such as each device's Wi-Fi MAC address, International Mobile Subscriber Identifier (IMSI), Bluetooth MAC address, Integrated Circuit Card ID (ICCID), or other detectable number or identifier from each device 130 and 135. In some embodiments, the unique identifier is set by the user 105-120 in other embodiments, the unique identifier is set by the contact tracing system or by the user device 125-140 itself. For example, the unique identifier could be a specific device identifier of the user device or a randomly generated number provided by the contact tracing system. By having the unique identifier set by the contact tracing system, this reduces the change that the same unique identifier is assigned to two or more user devices 125-140.

The user device A 125 then stores the unique identifier for each other user device 130 and 135 that it detects. In some embodiments, the user device A 125 scans for contacts on a periodic basis, such as once every three minutes or any other desired period of time. In some of these embodiments, the user device A 125 stores every time that specific device (and its corresponding identifier) was detected. In some embodiments, the user device A 125 stores when the user device, such as user device B 130, was first detected in user device A's area of contact 145. In some further embodiments, the user device A 125 also stores the last time that user device B 130 was detected in user device A's area of contact 145. In still further embodiments, user device A 125 stores every time that user device B 130 was in user device A's area of contact 145 for a predetermine period of time, such as, but not limited to two weeks. After the predetermined period of time, user device A 125 may delete any entries that are older than the predetermined period of time or another setting.

While user device A 125 is storing information about user device B 130 being in A's area of contact 145, user devices B 130 and C 135 are storing information about detecting user device A 125 and each other.

Figure 2A:
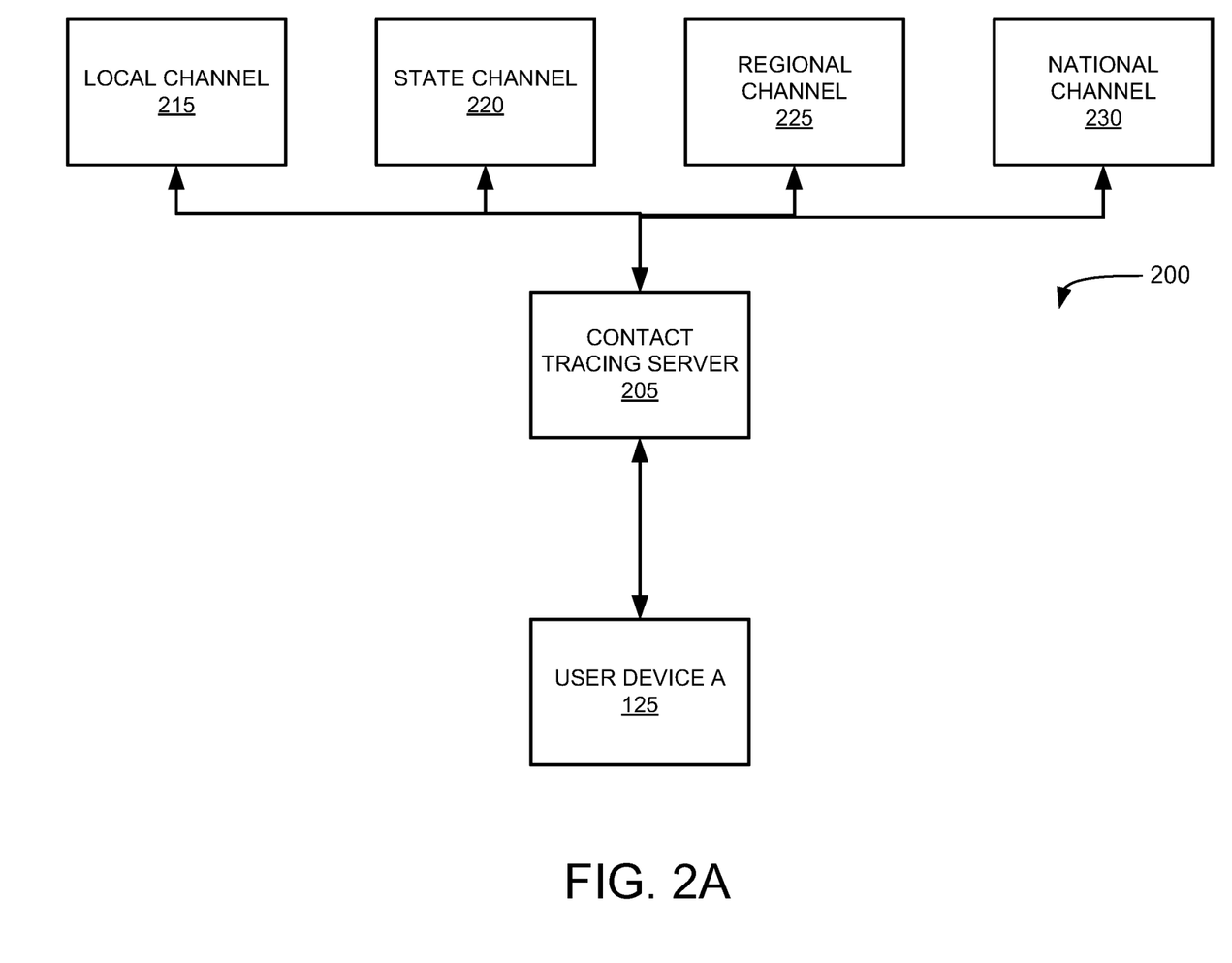
FIGS. 2A-2C illustrate block diagrams of the contact tracing systems in accordance with at least one embodiment.
Figure 2B:
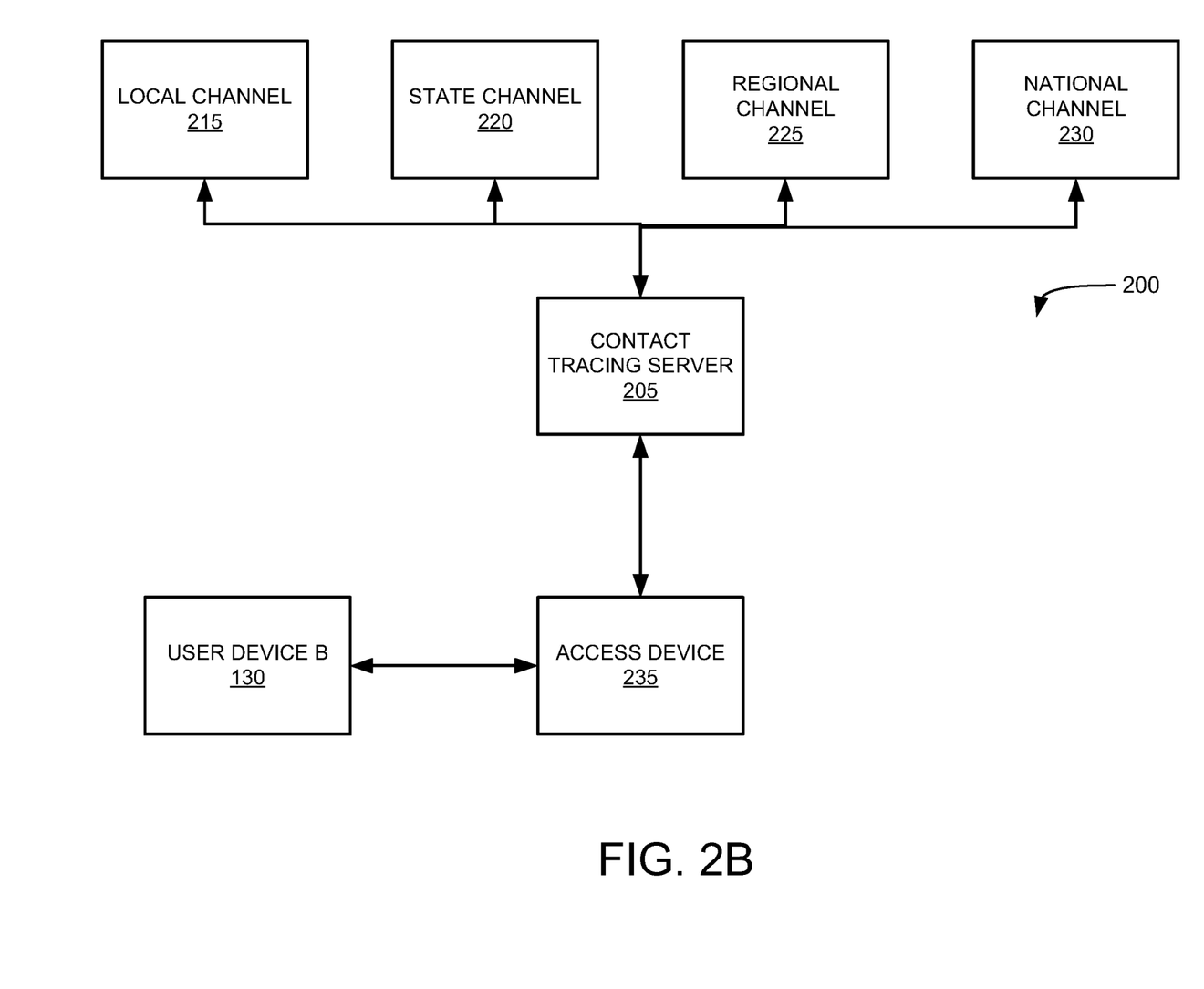
Figure 2C:
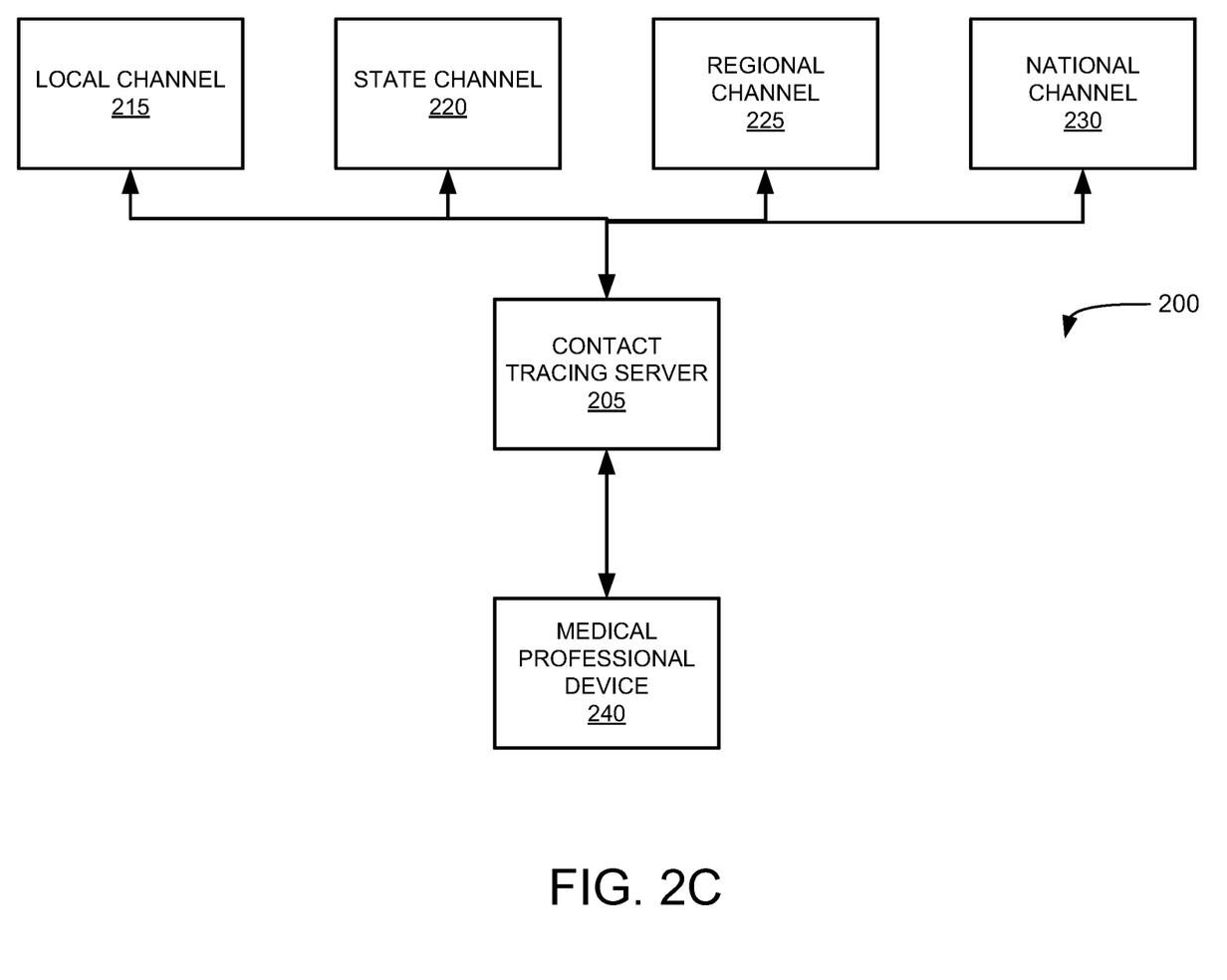

FIGS. 2A-2C illustrate block diagrams of the contact tracing systems 200 in accordance with at least one embodiment. FIG. 2A illustrates a first configuration for contact tracing system 200. Contact tracing system 200 is set-up to store information about individuals that have reported symptoms, positive test results, negative test results, and other information about their potential infection status and compare that information to stored contacts.

In contact tracing system 200, user device A 125 stores a plurality of contacts that have occurred between user device A 125 and other user devices, representing contacts between their corresponding users 105-120 (shown in FIG. 1). In some embodiments, these contacts are stored as database or other entries. In some of these embodiments, the contact entries include, but are not limited to, the unique identifier of the contact, when the contact was in the user devices area of contact 145-160 (shown in FIG. 1), how long the contact was for, where the user 105-120 was when the contact was made (Global Positioning System coordinates), and other information as desired.

In FIG. 2A, the user device A 125 is capable of communicating with a contact tracing server 205. For the purposes of this discussion, user device A 125 capable of connecting to contact tracing server 205 using the Internet, a local area network (LAN), or a wide area network (WAN). The contact tracing server 205 is an interface that allows the user 105 of user device A 125 to determine if any of their contacts have symptoms and/or have become infected. In the exemplary embodiment, contact tracing server 205 is in communication with a plurality of channels 210 for tracking users with symptoms and/or that tested positive for an infection. While this disclosure is written in view of the COVID 19 pandemic, ones having skill in the art would understand that these systems and methods would also work for other illness and/or infections.

Each of the channels 210 includes a list of users that have reported having symptoms and/or having a positive or a negative infection test. The channels 210 each include a list of unique identifiers, if the person had symptoms, what those symptoms were, if the person got an infection test, and what the results of this test were. To protect the privacy of the individuals, the list of unique identifiers does not include any personally identifying information, although the list may include city and state of residence to improve data gathering and knowing which channels 210 to assign the person's information to. The channels 210 are used to break down the infection reporting information into manageable pieces. As shown here, there are four major channels 210, a local channel 215, a state channel 220, a regional channel 225, and a national channel 230. Rather than searching through all of the entries in the national channel 230, the user 105 may be subscribed to a local channel 215. The local channel 210 can be for a city or town, for a county, for a series of neighborhoods or other portion of a municipality. There can be multiple stacking local channels 215. For example, there could be a local channel 215 for a university or other school, another local channel 215 for the side of town where the university resides, a further local channel 215 for the town itself, and an additional local channel 215 for the entire county. Channels 210 can be divided up in multiple different manners based on the needs of the users.

In at least one embodiment, the contact tracing server 205 and the channels 210 are built using a pub/sub architecture, where user device A 125 is a subscriber to their desired channels 210.

Furthermore, each user 105-120 can subscribe to each channel 210 that they desire. For example, if the user 105 lives in Denver Colorado, they may subscribe to the Denver local channel 215. They may also be subscribed to a channel 210 for the local high school that one of their children attends. If the user 105 travels up to Boulder Colorado for work, they may also sign up for the Boulder local channel 215.

In the exemplary embodiment, the user A 105 can upload their infection status to the contact tracing server 205. In the exemplary embodiment, the contact tracing server 205 tracks specific conditions, such as symptoms and positive and negative tests. In some embodiments, the contact tracing server 205 only tracks unique identifiers with one of those conditions, rather than all of the unique identifiers. When a user A 105 uploads their infection status, if the infection status includes one of those conditions, the contact tracing server 205 transmits a notification to each of the subscribed user devices 125-140. For example, if the user A 105 submitted that they had a positive test, then the contact tracing server 205 would store that information and transmit a notification to each user device 125-140 that has subscribed to the appropriate channels. If user A 105 is a university student at a university in Denver, then the notification could be transmitted to subscribers to the university local channel 215, the Denver local channel 215, the Colorado channel 220, the Western States channel 225, and the United States channel 230. If user C 115 lived in Denver and was subscribed to the Denver local channel 215, then user device C 115 would receive a notification that unique identifier A had a positive test. User device C 135 would then scan through the contacts that user C 115 has made in the last two weeks. If user device C 135 identifies a contact with the same unique identifier as that in the notification, the user device C 135 informs the user C 115.

In some embodiments, the contact tracing server 205 transmits notifications every time a new entry is added. In other embodiments, the contact tracing server 205 transmits notifications on a periodic basis, such as once an hour, one a day, etc.

In other embodiments, the user device C 135 can request past notifications. For example, if user C 115 just activated the contact tracing, then user device C 135 can request the notifications for a previous period of time, such as two weeks. In another example, user device C 135 could be traveling to another city, aka New York City, and want to load the contact tracing information for that city.

In some embodiments, the user devices 125-140 can store all of the unique identifiers that they received notifications about for a period of time, such as the last two weeks. When the user device 125-140 detects that an individual associated with one of those notified unique identifiers is within the user device's area of contact 145-160, the user device 125-140 can present an alert to the user 105-120 that they are in contact range of someone that either had symptoms or had a positive test.

In some embodiments, a user A 105 reports that they have symptoms to the contact tracing server 205. The contact tracing server 205 transmits a notification to the appropriate subscribing user devices 125-140. Later the user A 105 reports a negative test. The contact tracing server 205 then transmits a notification about the negative test. The receiving user device 125-140 can then inform the user 105-120 that their contact had a negative result.

In the exemplary embodiment, the user device 125-140 stores all of the unique identifiers and other information for its contacts. The contacts are not uploaded to the contact tracing server 205, but instead remain on the user device 125-140. In some embodiments, the user device 125-140 can search for unique identifiers through the contact tracing server 205 to see if those unique identifiers have had symptoms or tested positive/negative.

In some embodiments, officials can access the data in the different channels 210 better track infection rates at local, regional, national, and global scales in real-time. Since the channels 210 only include unique identifiers and residence city/state information, the data provided to the channels is clear of personally identifiable information and can be used for further research. Furthermore, reported infections and possible infections can be aggregated and used for early warnings of hot sports.

Since the contact information is only stored on the user devices 125-140, the privacy of the individuals and their activities are protected from most privacy and tracking concerns.

In some embodiments, the user A 105 can request a one-time personal identifier from one of the user device A 125 and the contact tracing server 205. The one-time personal identifier is tied to the user's unique identifier. The one-time personal identifier can be used for providing to healthcare providers and others who may need temporary (one-time) access to the user's information. In some embodiments, a temporary personal identifier can be used, where the temporary personal identifier has an expiration time.

In some embodiments, the channels 210 that the user A 105 is associated with are based on the user's current location, such as through GPS. The user device A 125 could automatically determine the user's current location and automatically subscribe to a local queue 215 associated with the user's current location.

In some embodiments, the channels 210 store notification information permanently to assist with research purposes, but where the notification information is only available to users for a predetermined period of time. In these embodiments, the information is phased out as it ages and becomes less relevant.

In FIG. 2B, the user device B 130 connects to the contact tracing server 205 through an access device 235. In some embodiments, user device B 130 could be a device with lesser processing power or capabilities. In these embodiments, user device B 130 is capable of detecting and storing contacts, while the access device 235 performs the processing to check to see if there are matches between contacts and the notifications. In these embodiments, user device B 130 uploads its contact information to access device 235. Access device 235 receives the notifications from contact tracing server 205 and determines if there are any matches. Access device 235 then informs the user B 110 if any matches are found. Access device 235 is any device capable of connecting to contact tracing server 205 using the Internet, a local area network (LAN), or a wide area network (WAN). For example, access device 235 could include a smart home hub that connects to user device B 130 and retrieves the contact information from user device B 130 to use in contact tracing as described further herein In FIG. 2C, the system 200 also includes a medical professional device 240 that allows a medical professional to upload information about different users as long as the medical processional has access to the individual's unique identifier. The unique identifier may be provided as a part of a check-in procedure at the medical facility or testing facility. In some embodiments, only medical professionals and/or healthcare providers could provide/upload status changes to the channels 210. These may require additional information, such as confirmation codes or approval by an operator/healthcare worker/nurse/doctor. This confirmation could be required for when an individual user inputs their own status change. This could allow for channels 210 to include self-reported status changes (unconfirmed) as well as official status changes (confirmed by a healthcare worker). Some channels 210 could be official channels while others are self-reporting channels 210 and the user could subscribe to whichever channels 210 they desire.

In some cases where an official channel 210 is available, notifications from unofficial channels could be individually screened. The screen requirements and mechanisms might depend on local health officials, authorities, and rules. Screened notifications that pass the validation rules could then be routed to the official channel for publication. The difference in notification messages across the official and unofficial channels 210 could provide insights about possible abuse of the system that might require additional authorization procedures.

When a healthcare provider receives unique identifiers from individual patients, the healthcare provider can use that identifier to send notifications related to one of their other patients. For example, a positive result comes back, and the subject has previously shared a one-time personal identifier with the provider during his test. The health official can send a positive notification that only the patient can understand. The app will then send the notification, together with all the masked identifiers for the interfaces to the notification channel 210. The health officials will be able to recognize their own patient and forward the notification to the official channel 210 (where the process can be automated).

In some further embodiments, the local channels 215 can be augmented to provide notifications related to important local messages. Local requirements and enforced (or non-enforced) legislation can be sent in a dedicated local law channel 215 that can be used to provide up-to-date information to local communities. This can combine the possibility to have access to other resources, local data, and maybe providing local feedback options for the local governments are all strategies that can be used to help the adoption of the system 200 both by local authorities and by users.

In still further embodiments, a gamification of the application or inclusion of the code other major installed applications could be a possible venue for increasing contact tracing in schools. For example, the code for the system 200 could be added to a required school application, such as a class scheduling or homework application.

Figure 3:
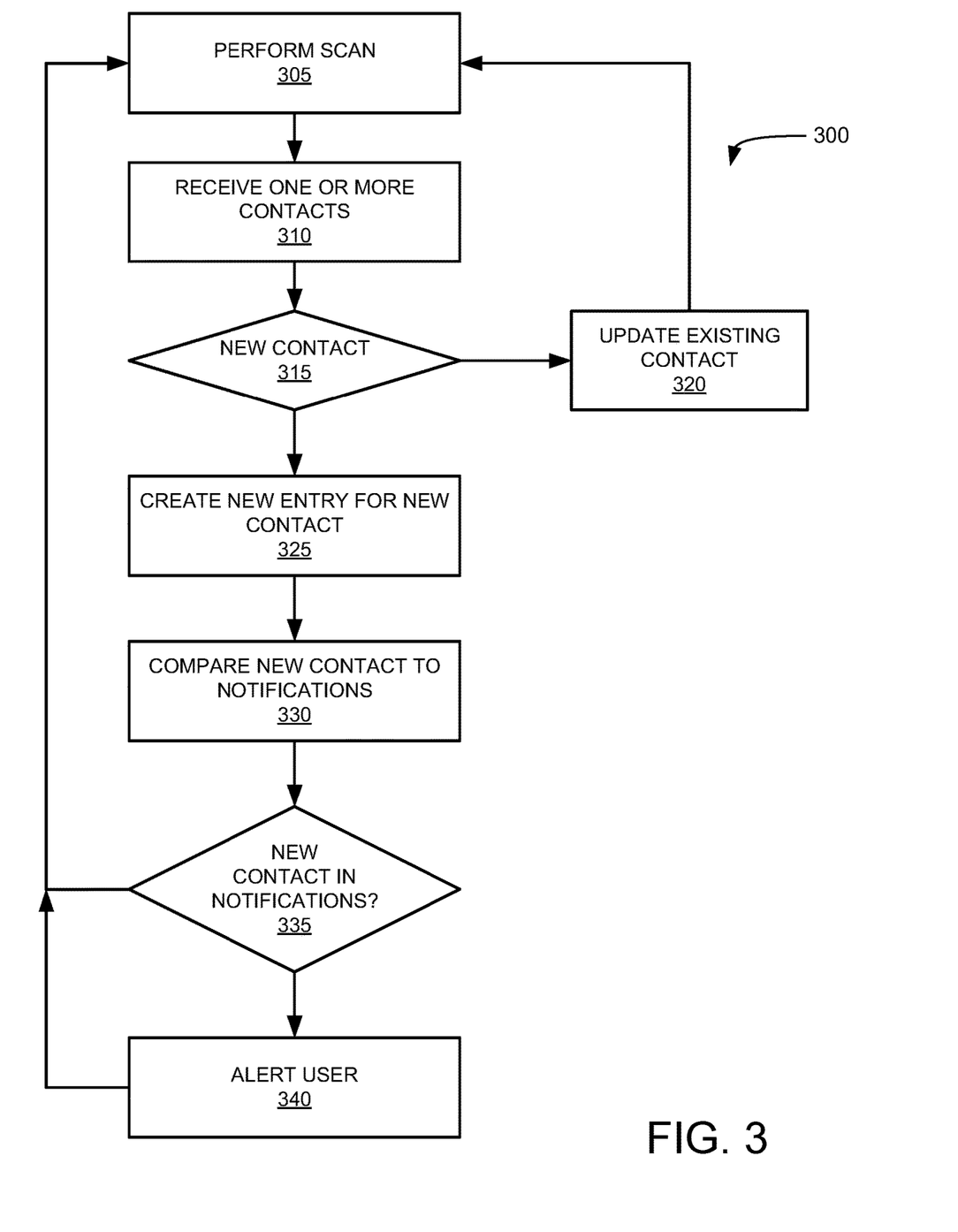
FIG. 3 illustrates a process for monitoring contacts using the contract tracing system shown in FIGS. 2A-2C.

FIG. 3 illustrates a process 300 for monitoring contacts using the contract tracing system 200 (shown in FIGS. 2A-2C). In the exemplary embodiment, process 300 is performed by a user device, such as user device A 125 (shown in FIG. 1).

In the exemplary embodiment, user device A 125 performs 305 a scan of its area of contact 145. In the exemplary embodiment, user device A 125 performs 305 a scan on a periodic basis, such as once every two to three minutes. In some embodiments, the scan can occur more frequently or less frequently. User device A 125 detects 310 one or more contacts in its area of contact 145. For each other user device 130-140 in the area of contact 145, the user device A 125 determines the unique identifier for the contact. In some embodiments, each user device 125-140 is broadcasting its unique identifier. In other embodiments, the user device A 125 broadcasts a contact request message to which each participating user device 130-140 that receives the contact request message responds with a contact response message that includes that user device's unique identifier.

In the exemplary embodiment, user device A 125 determines 315 if the detected contacts are new contacts. If the user device A 125 determines 315 that none of the contacts are new, then the user device A 125 updates 320 existing contacts based on the detected contacts. For example, if the user device A 125 has been detecting user device C 135 for the last three scans, then user device A 125 can update the entry for user device C 135 to update the duration of the contact. After the existing contacts are updated 320, process 300 returns to Step 305.

If one or more of the contacts are new, the user device A 125 creates 325 and stores a new entry for the new contact. In some embodiments, the user device A 125 compares 330 the new contact to the notifications. In some of these embodiments, the user device A 125 transmits a request with the unique identifier from the new contact to the contact tracing server 205, where the contact tracing server 205 returns any notifications/status associated with that unique identifier. In other embodiments, the user device A 125 stores a plurality of previously received notifications and compares those to the unique identifier of the new contact. The user device A 125 determines 335 if the new contact is in the notifications. If the new contact is not in the notifications, then process 300 returns to step S305. If the new contact is in the notifications, the user device A 125 alerts 340 the user and returns to step S305.

In the exemplary embodiment, the user device A 125 only stores contact information for contacts that were made within a predetermined period of time in the past, such as the last two weeks. As contact information ages out of the predetermined period of time, the expired contact information is deleted or overwritten.

In some further embodiments, user device A 125 determines whether or not to add a new contact based on the number of times that the individual is scanned and for how long the individual was within range of user device A 125. For example, if the new contact only appears once and does not appear in a second scan, then the user device A 125 could discard the new contact as a glancing contact. However, if the new contact is within the area of contact 145 for two to three scans or a predetermined amount of time, the new contact is added.

In some other embodiments, user device A 125 might filter the individuals that are added to the contacts. For example, if the user device A 125 is in a vehicle or car mode, such as the user A 105 is in their vehicle traveling on a road, then the user device A 125 may suspend tracking. However, if the user A 105 is on public transportation, such as a bus, train, or aircraft, then the user device A 125 would then consider those individuals that stay within the area of contact 145 for a predetermined period of time or number of scans as contacts, as those would most likely be the individuals sharing a public space with user A 105. In some embodiments, sensor data, such as from accelerometers or GPS, can be used to determine whether or not it is appropriate to add individuals as contacts.

Another special case is large gatherings, where a large number of people are present. With some devices, there is a potential to run out of memory adding in everyone that shows up in the user's area of contact 145. There are different techniques that can be used to limit the number of identifiers that are saved with each scan. In some embodiments, the number of identifiers per scan are limited by the power and number of devices in the area of contact 145. For example, the user device A 125 can only add a specific number of devices per scan. In these embodiments, the user device A 125 only adds those devices with the strongest signal strength as those are most likely the closest to the user device A 125. The user device A 125 discards those entries that are outside of the maximum number and/or below a specific signal strength.

In another large gathering embodiment, the user device A 125 stores infrastructure identifiers, rather than individual identifiers. For example, the user device A 125 uses and stores the Wi-fi Access Point, such as access point 235 (shown in FIG. 2), as the contact identifier for the gathering it-self. In these embodiments, the access point 235 keeps a list of user devices 125-140 that connected to it or that it detected. It also knows when each user device 125-140 associated with each identifier was nearby. If one of the unique identifiers comes back with a status change notification, the access point 235 can inform the contact tracing server 205, which links the status change notification with the access point's identifier and transmits a notification including the access point's unique identifier and the status change. This allows the user device A 125 to detect that someone at the event had a status change and alert the user A 105.

In some embodiments, instead of the user device A 125 storing unique identifiers of other user devices 130-140, access device 235 (or other access points) collect the identifiers of user devices 125-140 within range. When an individual is reported to be in the proximity of public Aps, the system 200 can used a dedicated channel 210 to report possible public identifiers that were exposed to positive individuals. The contact tracing server 205 can transmit notifications stating when positive individuals were near specific access points. This can be checked against the access point identifiers stored by the user devices 125-140. In this embodiment, the notification may include the times that the positive individual was near the access point, so that the user device 125-140 can compare that to the stored times of when the user device 125-140 was near the access point for any potential overlap.

Figure 4:
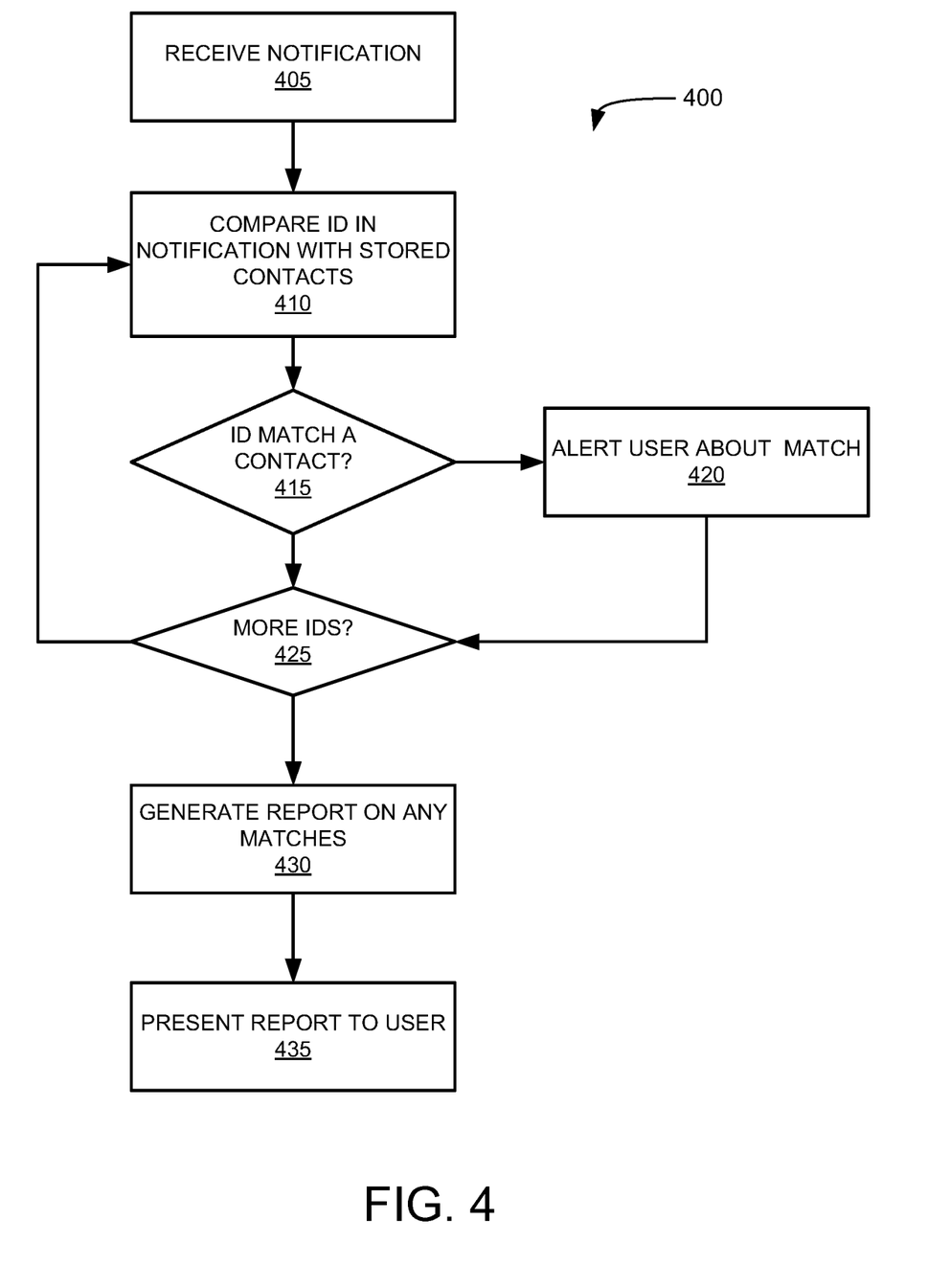
FIG. 4 illustrates a process for evaluating contacts made using the process shown in FIG. 3 with the contract tracing system shown in FIGS. 2A-2C.

FIG. 4 illustrates a process for evaluating contacts made using the process 300 (shown in FIG. 3) with the contract tracing system 200 (shown in FIGS. 2A-2C). In the exemplary embodiment, process 400 is performed by a user device, such as user device A 125 (shown in FIG. 1).

In the exemplary embodiment, the user device A 125 receives 405 a notification from the contact tracing server 205. The notification is based on information in the channels 210 (FIG. 2) that user A 105 (shown in FIG. 1) has signed up for. The notification includes information on one or more individuals whose status have changed. The notification at least includes a unique identifier for the individual. In the exemplary embodiment, the notification also includes the individual's updated status, for example, but not limited to, symptoms exhibited and test results. In some embodiments, a report of symptoms triggers a warning alert, letting the user know that there is a possible issue with this contact. In other embodiments, a report of a positive test triggers a full alert.

The user device A 125 compares 410 the unique identifier in the notification with the stored contacts in user device A 125. If there is a match 415, then the user device A 125 alerts 420 the user about the match. The user device A 125 checks 425 to see if there are more identifiers in the notification. If yes, then the user device A 125 proceeds to Step 410 to check the next identifier. If there are no more identifiers in the notification, the user device A 125 generates 430 a report on any matches. The user device A 125 presents 435 the report to the user. The report can include information about the contacts that were in the notification for having status changes. For example, the report could include when, where, and for how long user A 105 was in contact with the individual with the status change. This allows user A 105 to determine which actions to take, such as, but not limited to, self-quarantine, getting a test themselves, taking additional precautions, or not taking any additional measures. For example, if user A 105 was in contact with an individual with symptoms for one scan while user A 105 was masked while walking down the street last week, then the user might not be concerned. If in another example, user A 105 determines that they were near an individual that tested positive for half an hour in a restaurant two days ago, then user A 105 may be more concerned.

In some embodiments, a user can give their unique identifier to a loved one to see if the user is safe. In other embodiments, a medical professional can have the user's unique identifier to track the health of their patients, etc. In some further embodiments, when the user device finds a match, it alerts 420 the user and their loved ones and/or their medical professionals.

In some other embodiment, to help users that join the system to be aware of all notifications that might affect them (not only the ones from the moment they join the system 200 onward), the system 200 could repeat notifications for confirmed cases once in a determined period, such as one day, two days, etc. This helps to cover the case when user A 105 declares a state change (infected) and user B 110 joins the system 200 after user device A 125 sent its notifications. This protects against the situation where user B 110 could now be in proximity of user A 105 but have no information about the notification that happened earlier. User B 110 monitors the channel 210 for at least one period and during that period all notifications are repeated, and the user device B 130 can check also for past events in the period.

To prevent causing too much traffic when repeating notifications, the contact tracing server 205 can set-up special channels 210 and/or URL for user devices 125-140 to download every notification for the past period. For example, a special channel 210 with all the notifications sent in the past period can be available. This period is the period that the user shall be aware of the notification. For example, for COVID-19 the period could be 2-3 weeks given its incubation period. The system 200 automatically deletes message outside of that period window.

In some further embodiments, to increase privacy, the unique identifier is received by the user device A 125 from the scan, but instead of storing the unique identifier itself, the user device A 125 stores a hash of the unique identifier. The hash function is one that is used by the entire system 200. Although different has functions may be used in different regions and/or for different types of unique identifiers. For example, a first hashing function may be used for the unique identifiers that are based on Wi-Fi MAC addresses, while a second hashing function is used for unique identifiers that are based on IMSI. When the user device A 125 transmits a status update to the contact tracing server 205, the user device's unique identifier is transmitted unhashed, where the contact tracing server 205 hashes the unique identifier before transmitting the hashed unique identifier. Since the unique identifier is hashed in the storage of the receiving user devices 130-140, then the hashes are compared. This increases the privacy level by not storing unique identifiers, such as IMSIs, the both the channels 210 and in individual user devices.

The system 200 can be implemented with hardware modules or full stand-alone devices can be developed to provide users access to the system 200 without requiring connections on their own user devices 125-140. Simple devices could include a processor with a network/Wi-Fi module and a BLE one. These devices could be worn, much like fitness trackers and connect to other devices, such as smart phones to download their contact information.

The system 200 can also be implemented with software added to existing hardware. Software components can be provided for existing platforms and SDKs to integrate APIs (local network) or processing (store traces, monitor notifications, and lookup traces). System 200 can also be implemented with mobile apps that take full advantage of the sensors available on the user devices 125-140, such as smartphones, to provide more accuracy and additional data that can be leveraged by the contact-tracing algorithms.

In some embodiments, the system 200 can be implemented with cable modems (CMs) or cloud-based services. This can also allow for monitoring the channels 210 for distant relatives. The CMs or cloud-based services can also be enabled on cable to provide support for tracing data storage and lookup processing. APIs and/or web interfaces can be limited so that access can only occur from home-based connections. Services can be limited to only be locally accessible for added security. If backup store is provided, the data can be fully encrypted using keys, such as PKI, where the keys might not be shared with the storing service.

Remote Monitoring

In some embodiments, the APIs and/or web interfaces can be used to provide the user A 105 with the possibility to upload specific contacts information (including sharable personal identifiers (SPI)) to be monitored on the channels 210 and receive notifications for those people. The SPIs are different than the user's unique identifier.

For example, at registration with the system 200, or at any time, the user can pick a sharable personal identifier (SPI). The user can share their own SPI with loved ones that they want to be able to receive notifications for the user's status. All parties with the SPI would be able to recognize the notifications, but parties without the SPI could not be able to recognize the notifications.

When an SPI is shared with a user, the user can then check for each received notification, if the notification is related to the received SPI. The user device calculates the authentication header for each SPI. When the header matches, the notification is related to someone who shared their SPI with the user.

When notifications are sent to non-local channels (e.g., regional 225 or national 230), the information about the interfaces might not be necessary anymore. In these cases, when aggregation notifications outside of the local channels 210, the system 200 can remove all information related to the interface can be removed.

Contact Data Storage

The system 200 can use multiple different identifiers, such as, but not limited to, Wi-Fi MAC address, BLE Beacons, BLE MAC Address, IMSI, etc. The user device A 125-140 store the unique identifiers of their contacts to check for any relevant exposure. In some embodiments, these unique identifiers are kept in one or more tables. In one example, the table can store the unique identifier, an associated type and a value.

In some embodiments, the contact tracing lookup data can include the unique identifier with the first time that the device associated with the unique identifier was scanned and the last time that it was scanned in consecutive scans. In this embodiment, the user device A 125 updates the entry for a unique identifier every time that unique identifier is in a consecutive scan, such as in Step 320 (shown in FIG. 3). For example, the entry could include the unique identifier, the start time, and then end time.

In some embodiments, the time field can be reduced to 16 bits to reduce the amount of memory used for the contact database. In these embodiments, the time field is expressed in minutes from a set beginning timestamp of the current period. This value is then updated whenever the time for the current period is updated. Using a start time and an end time for the contact duration can provide coverage of 45 days if the 16-bit times are in minutes and 90 months if the 16-bit times are in hours.

In still further embodiments, a new contact and corresponding unique identifier is only kept if the unique identifier was seen for two or more consecutive scans (or based on the total amount of time seen). Of if the period between times when an identifier is detected is greater than a set value (e.g., 30 or 60 minutes). In these embodiments, the unique identifier can be kept if two non-consecutive scans detect the unique identifier within the predetermined period of time, aka two times in 30 minutes. In these embodiments, the user device A 125 deletes single scanned unique identifiers after the predetermined period of time.

In some embodiments, the user device A 125 updates the list of contacts to purge older and no longer valid entries (single scan only). This can occur at regular intervals (aka once a day, once an hour). This update process can start with advancing the current baseline time $T_{BASELINE}$ to the current time. The time differential $T_{DIFF}$ is the current time minus the $T_{BASELINE}$, where $T_{BASELINE}$ is updated to the current time after the comparison. Then $T_{DIFF}$ is applied to start times and end times of the entries in the contact list, to update them.

When using the times, such as for notifications and reports, the relative times from the contact list are updated based on the current time.

Notification Structure

Notifications can be implemented in several methods. In one implementation, notifications pushed from the users are pre-pended by the system 200 with an anonymous authentication header. For example, an example 96-byte notification could be:

TIMESTAMP|NONCE|Hash(NONCE|FACE)|Hash(NONCE|SPI|TIMESTAMP)|0x00

The timestamp is an ASCII representation of the Generalized Time (YYYYMMDDHHMMSSZ). The NONCE is a cryptographically secure one-time random value composed of 16 octets. In at least one embodiment, the NONCE is taken from the submitted notification of the user. The SPI is a shareable personal identifier—a random PIN provided by the client when submitting the notification. In at least one embodiment, the SPI is optional and would be provided by the application or system 200.

The notification data could then be contained in 64 bytes. The identifiers are concealed by the contact tracing server 205, with one notification for each address that the user wants to share. The notification data includes the Hash (NONCE|IFACE), where the IFACE is an ASCII representation of the hardware address with hexadecimal (uppercase). The contact tracing server 205 computes the salted hash with the NONCE and replaces the value in the message payload. This guarantees uniqueness for the same hardware address across messages. The user sends the IFACE value to the contact tracing server 205, which replaces the IFACE value with Hash(NONCE|IFACE) before adding it to the message queue.

In at least one notification embodiment, the user device A 125 transmits the NONCE, IFACE, and optionally, the SPI to the contact tracing server 205. The contact tracing server 205 then generates the actual notification message based on the provided information.

In some embodiments, the contact tracing server 205 stores additional information from testing, such as the start date, type, results, and the test site. The start date represents GMT Date when the subject most likely became infected. If no date is provided, the system 200 can automatically adjust this parameter to {Now−X days} (X is a system's parameter/config). The type is the test type, which could support up to 255 types of tests, for example, but not limited to, 0=nasal swab, 1=blood test, and 2=antibodies test. The results could be stored as positive or negative. The test site would be an optional identification of the test site itself.

In some further implementations, the system 200 can perform data authentication at the Transport Layer. Specifically, by authenticating user devices 125-140 and encrypting the communication, the system 200 guarantees that an authorized user device 125-140 submitted a valid notification. When the use of transport layer security is not an option, the system 200 can authenticate messages by using the submission server's digital identities (e.g., certificates and private keys) to sign messages before they are added to the channels 210. Message authentication can be achieved by using CMS (Cryptographic Message Syntax) and embedding the signed content within the CMS itself. The validation of the messages require a common Trust Anchor or a common set of Trust Anchors for user devices 125-140 to be able to validate the server's signatures and certificates.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., time variant parameters, digital signatures, certificates, unique identifiers, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Exemplary embodiments of systems and methods for privacy protected contact tracing are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A user device for privacy protecting contact tracing, comprising:
    a transceiver configured for operable communication with at least one server;
    a processor including a memory configured to store computer-executable instructions, which, when executed by the processor, cause the user device to:
        perform, by the transceiver, a scan to detect one or more nearby devices;
        identify a unique identifier for each of the one or more nearby devices;
        for each corresponding device of the one or more nearby devices, determine whether or not to store the corresponding unique identifier based on a comparison of accelerometer information for the user device and the corresponding device;
        store one or more of the unique identifiers of the one or more nearby devices based upon the determination;
        receive a notification including a first unique identifier;
        compare the first unique identifier to the one or more stored unique identifiers; and
        alert the user of the user device if the first unique identifier matches one of the one or more stored unique identifiers.

2. The user device of claim 1, wherein the scan is a first scan, and wherein the instructions further cause the user device to:
    perform, by the transceiver, a second scan to detect one or more nearby devices;
    determine at least one device detected in the first scan and the second scan; and store the unique identifier of the at least one device detected in the first scan and the second scan.

3. The user device of claim 1, wherein the instructions further cause the user device to store a time associated with the scan with the stored unique identifiers.

4. The user device of claim 1, wherein the user device further comprises a Global Positioning System, and wherein the instructions further cause the user device to store a location associated with the scan with the stored unique identifiers.

5. The user device of claim 1, wherein the notification further includes a status change, and where the instructions further cause the user device to alert the user of the user device of the status change if the first unique identifier matches one of the stored unique identifiers.

6. The user device of claim 1, wherein the instructions further cause the user device to:
receive, from the user, a subscription request for a channel associated with a location; and
receive, from a server associated with the channel, one or more notifications associated with the location.

7. The user device of claim 1, wherein the instructions further cause the user device to:
determine a current location of the user;
determine a channel associated with the current location of the user; and
request one or more notifications from the channel based on the unique identifiers of the one or more nearby devices.

8. The user device of claim 1, wherein the instructions further cause the user device to:
receive a status update from the user; and
transmit the status update to the at least one server, wherein the at least one server is configured to generate and transmit a notification based on the status update from the user.

9. The user device of claim 1, wherein the instructions further cause the user device to:
receive an identifier from an access point;
store the identifier of the access point, wherein the access point represents a location visited by the user;
compare the first unique identifier to the stored identifier of the access point; and
alert the user of the user device if the first unique identifier matches the stored identifier of the access point.

10. The user device of claim 1, wherein the instructions further cause the user device to:
receive a plurality of historical notifications, wherein each notification of the plurality of historical notifications includes a unique identifier;
compare the plurality of historical unique identifiers to the unique identifier for each of the one or more nearby devices; and
alert the user of the user device if one of the unique identifiers of the one or more nearby devices matches one of the historical unique identifiers in the plurality of historical unique identifiers.

11. The user device of claim 1, wherein the instructions further cause the user device to determine whether or not to store the corresponding unique identifier based on if a signal strength of the corresponding device exceeds a predetermined threshold.

12. The user device of claim 1, wherein the instructions further cause the user device to determine whether or not to store the corresponding unique identifier based on a maximum number of unique identifiers to store for the scan.

13. The user device of claim 1, wherein the instructions further cause the user device to scan to detect one or more nearby user devices within a predetermined area of contact, wherein the predetermined area of contact includes a size based upon a current location of the user device.

14. The user device of claim 1, wherein the instructions further cause the user device to discard a stored corresponding unique identifier if the corresponding device was only detected in a single scan in a predetermined period of time.

15. The user device of claim 1, wherein the instructions further cause the user device to store the corresponding unique identifier after the corresponding device has been detected in multiple consecutive scans or multiple scans within a predetermined period of time.

16. A method for privacy protecting contact tracing, the method comprising:
scanning, by a user device, an area around the user device to detect one or more nearby devices;
identifying, by the user device, a unique identifier for each of the one or more nearby devices;
for each corresponding device of the one or more nearby devices, determining whether or not to store the corresponding unique identifier based on a comparison of accelerometer information for the user device and the corresponding device;
storing, in the user device, one or more of the unique identifiers of the one or more nearby devices based upon the determination;
receiving, by the user device, a notification including a first unique identifier;
comparing, by the user device, the first unique identifier to the one or more stored unique identifiers; and
alerting, by the user device, the user of the user device if the first unique identifier matches one of the one or more stored unique identifiers.

17. The method of claim 16, wherein the scan is a first scan, and wherein the method further comprises:
performing, by the user device, a second scan to detect one or more nearby devices;
determining at least one device detected in the first scan and the second scan; and
storing the unique identifier of the at least one device detected in the first scan and the second scan.

18. The method of claim 16 further comprising:
storing a time associated with the scan with the stored unique identifiers; and
storing a location associated with the scan with the stored unique identifiers.

19. The method of claim 16 further comprising:
receiving, by the user device a status update from the user;
transmitting, from the user device to a server device, the status update to a server device;
generating, by the server device, a notification based on the status update from the user; and
transmitting, by the server device, the notification to a plurality of subscribed user devices.

20. A non-transitory computer-readable storage medium having computer-executable instructions embodied thereon, when executed by a user analytics computing device having at least one processor in communication with at least one memory and at least one transceiver, the computer-executable instructions cause the at least one processor to:
perform, by the transceiver, a scan to detect one or more nearby devices;
identify a unique identifier for each of the one or more nearby devices;

for each corresponding device of the one or more nearby devices, determine whether or not to store the corresponding unique identifier based on a comparison of accelerometer information for the user device and the corresponding device;
store one or more of the unique identifiers of the one or more nearby devices based upon the determination;
receive a notification including a first unique identifier;
compare the first unique identifier to the one or more stored unique identifiers; and
alert the user of the user device if the first unique identifier matches one of the one or more stored unique identifiers.

* * * * *